US009876750B2

(12) United States Patent
Mieritz et al.

(10) Patent No.: US 9,876,750 B2
(45) Date of Patent: Jan. 23, 2018

(54) SYSTEMS AND METHODS FOR MANAGING SMART POSTS IN FEEDS

(71) Applicant: salesforce.com, inc., San Francisco, CA (US)

(72) Inventors: Anna Bonner Mieritz, Montara, CA (US); Scott Peter Perket, San Francisco, CA (US); William Gradin, San Francisco, CA (US); Megan Danielle Hoagland, Seattle, WA (US); Richard L. Spencer, II, Seattle, WA (US); Lorne Keith Trudeau, Bainbridge Island, WA (US)

(73) Assignee: salesforce.com, inc., San Francisco, CA (US)

( * ) Notice: Subject to any disclaimer, the term of this patent is extended or adjusted under 35 U.S.C. 154(b) by 252 days.

(21) Appl. No.: 14/317,675

(22) Filed: Jun. 27, 2014

(65) Prior Publication Data
US 2015/0046530 A1    Feb. 12, 2015

Related U.S. Application Data

(60) Provisional application No. 61/862,834, filed on Aug. 6, 2013, provisional application No. 61/862,838, filed on Aug. 6, 2013, provisional application No. 61/862,842, filed on Aug. 6, 2013, provisional application No. 61/862,843, filed on Aug. 6, 2013.

(51) Int. Cl.
*H04L 12/58* (2006.01)
*G06Q 50/00* (2012.01)
*H04L 29/08* (2006.01)

(52) U.S. Cl.
CPC ............. *H04L 51/32* (2013.01); *G06Q 50/01* (2013.01); *H04L 67/02* (2013.01)

(58) Field of Classification Search
None
See application file for complete search history.

(56) References Cited

U.S. PATENT DOCUMENTS

| 8,996,625 | B1 * | 3/2015 | Singleton | H04L 29/06 707/771 |
| 2012/0005224 | A1 * | 1/2012 | Ahrens | G06Q 10/10 707/769 |
| 2012/0151377 | A1 * | 6/2012 | Schultz | G06Q 10/103 715/751 |
| 2012/0166964 | A1 * | 6/2012 | Tseng | G06F 3/048 715/745 |
| 2013/0179502 | A1 * | 7/2013 | Faller | H04L 65/403 709/204 |
| 2014/0013249 | A1 * | 1/2014 | Moeinifar | H04L 51/00 715/758 |
| 2014/0337361 | A1 * | 11/2014 | Gailis | G06F 17/30867 707/752 |

* cited by examiner

*Primary Examiner* — Thomas Dailey
(74) *Attorney, Agent, or Firm* — Lorenz & Kopf LLP

(57) ABSTRACT

Methods and systems are provided for reducing noise in a social media feed of the type including successive posts each having a substantially homogeneous format. The method may involve: identifying a plurality of related updates to a record; configuring a single smart post to include underlying content from each of the plurality of related updates, and a visual cue distinct from the substantially homogeneous format; and displaying the smart post in the feed.

18 Claims, 14 Drawing Sheets

SYSTEMS AND METHODS FOR MANAGING SMART POSTS IN FEEDS

CROSS-REFERENCE TO RELATED APPLICATIONS

This application claims the benefit of the following U.S. provisional patent applications: i) Ser. No. 61/862,834 filed Aug. 6, 2013; ii) Ser. No. 61/862,838 filed Aug. 6, 2013; iii) Ser. No. 61/862,842 filed Aug. 6, 2013; and iv) Ser. No. 61/862,843 filed Aug. 6, 2013. The entire contents of all of the foregoing are incorporated herein by this reference.

TECHNICAL FIELD

Embodiments of the subject matter described herein relate generally to computer systems and applications for tracking changes to an object stored in a database, and for pushing posts related to the tracked changes into a feed for viewing by users in an on-line community, and more particularly to techniques for applying intelligence to the displayed feed.

BACKGROUND

The unprecedented growth of social technologies has redefined the way people connect and communicate. On-line social networking sites such as Facebook™, Pinterest™, Tumblr™, Google+™, Hootsuite™, and Twitter™ have forever changed the way people share information with each other. In business environments, collaborative sites have changed the way groups of related users (e.g., "Deal Teams") share information about a sales opportunity or other issues surrounding products or services pursued or offered by the team. Presently known enterprise social network platforms such as Chatter™, released in June 2010 by Salesforce™ and available at www.salesforce.com, provide the user with a feed-based stream of posts for tracked objects Chatter™ users track changes to projects and sales opportunities by receiving broadcast updates about coworkers, files, and other project related data objects, sometimes referred to as "feed tracked changes", or FTCs. Users can also form groups and post messages on each other's profiles to facilitate collaboration.

At the same time, software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Presently known feed-based sites do not effectively reduce the noise associated with current "fire hose" feed presentation models so that the most relevant posts stand out to the subscriber. Systems and methods are thus needed which filter, prioritize, or otherwise apply intelligence to the manner in which posts are presented.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

Figures 13, 14:
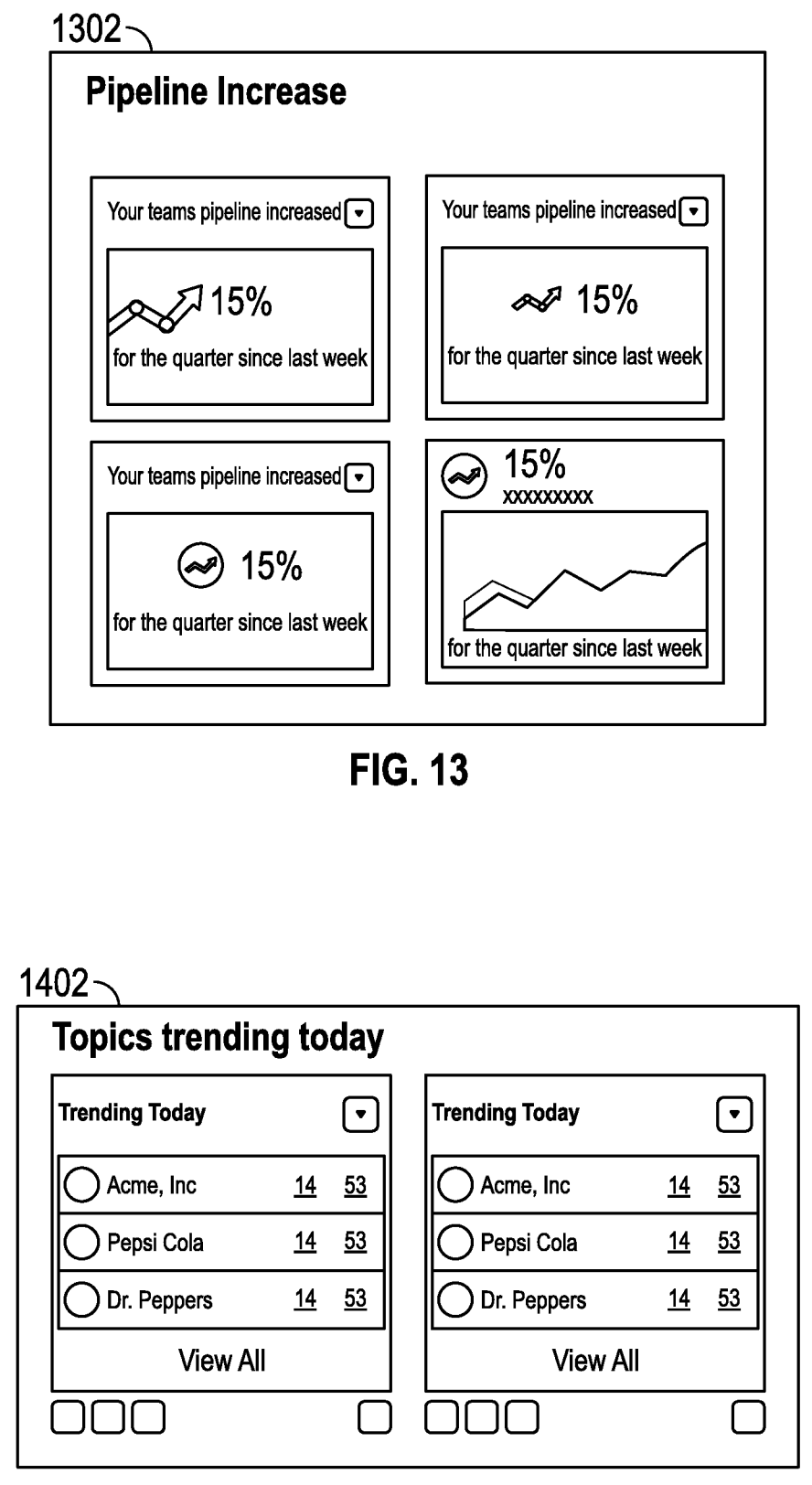

FIGS. 11, 12, 13, 14 and 15 illustrate various additional embodiments of hero posts;

DETAILED DESCRIPTION

Figure 1:
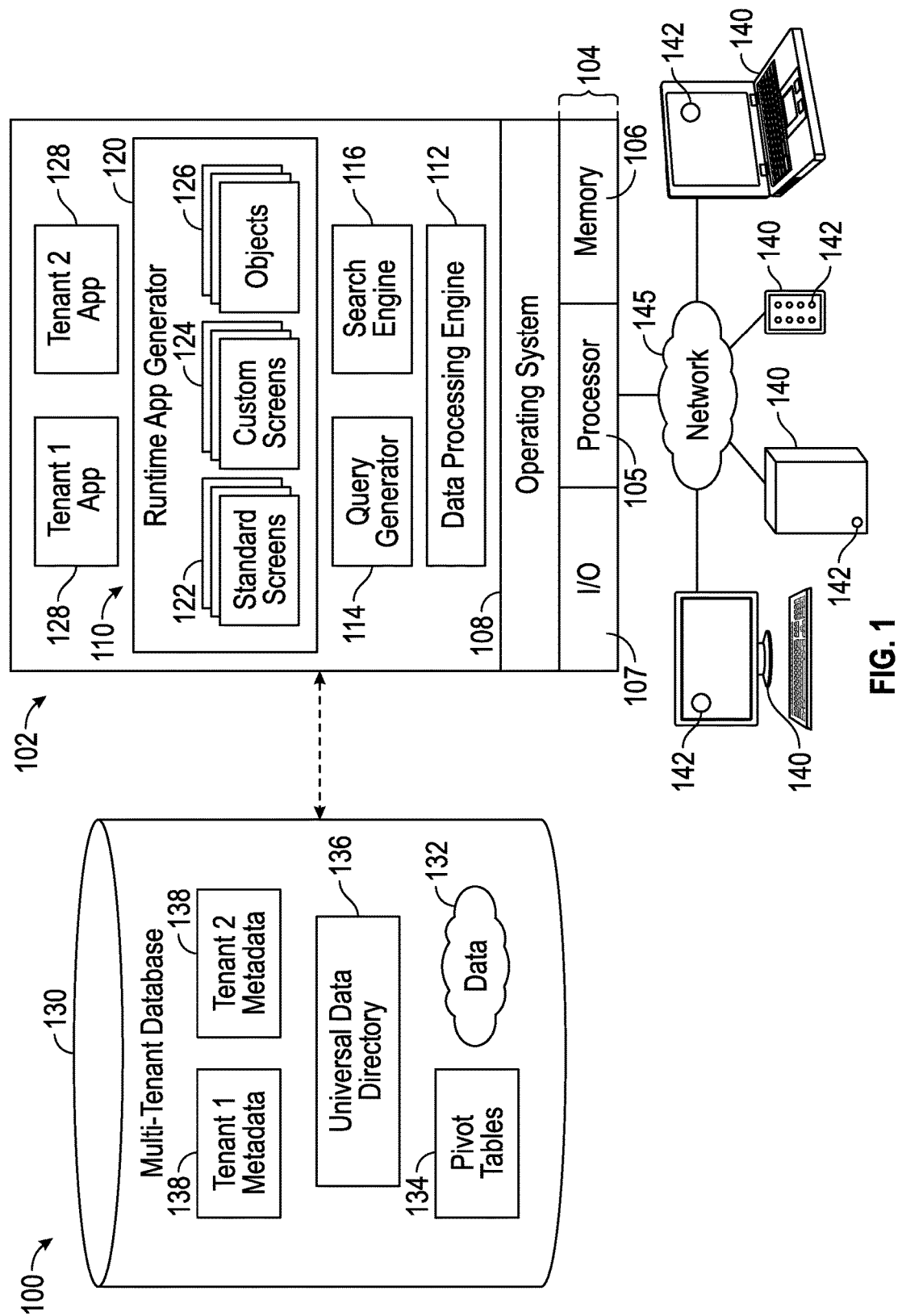
FIG. 1 is a schematic block diagram of a multi-tenant computing environment in accordance with an embodiment.

Embodiments of the subject matter described herein generally relate to systems and methods for applying intelligence to the manner in which posts are presented in a feed.

On-demand or multi-tenant database system and service environments, such as SALESFORCE.COM™ and Facebook™, employ content feeds to present information about records to an online user in the form of a stream of posts. The Chatter™ collaboration cloud is a web based enterprise file sharing solution that allows users to share, collaborate on, and manage files and other data objects with any number of authorized users or groups within their company or organization. Using CHATTER™, users follow other users and records that are being worked on by fellow team members such that changes or interactions may be viewed in a feed by users through mobile devices, desktop computers, tablet computers, and so forth.

While collaborative tools such as CHATTER enable users to share and consume information in a social manner, existing systems have not adequately addressed the problem of feed relevance. As a result, users may not be directed to the highest priority content through existing feed paradigms. Because many content posts may be displayed in a feed based on whether the viewing user has "followed" other users, accounts, contacts, files, leads, records, and the like, important posts may be lost or otherwise unnoticed amongst the "fire hose" of posts.

In an on-demand services environment, such as in a salesforce automation (SFA) application, objects (e.g., Accounts, Opportunities, Leads, Cases, Groups, Files,) may be associated with a corresponding feed for collaborating with other users of the on-demand services environment on that particular object. In current practice, groups of users (e.g., "Deal Team") are created to quickly access the feed items that are relevant to one or more objects. However, this leads to inefficient use of feeds for objects, such as opportunity feeds and account feeds.

As explained in greater detail below, summary tiles, smart posts, and clumped feed items (collectively referred to as "Smart FTCs") may be used to reduce noise. For example, a single summary post may indicate that "Michael created 3 tasks for this opportunity" and "Michael shared 3 files." Smart posts may also be based on smart criteria, such as thresholds, analytics, searches, and related user-generated objects in the on-demand services environment.

Summary posts may highlight groups, accounts, or other objects that have a lot of activity, such as file upload, addition of new contacts, increases in opportunity values, etc. Summary posts may be dynamically generated upon page load such that the posts change throughout the day. Potentially, posts may be made a favorite ("favorited") and/or pinned or bookmarked to allow a user to go back to drill down into a post later. Users may also create and save searches that use Boolean logic to specify certain criteria that narrow down the information that the user considers relevant. In such an example, a saved search may be associated with a customized summary post that includes updates on the desired records that satisfy the criteria.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter system, described below.

Figure 2:
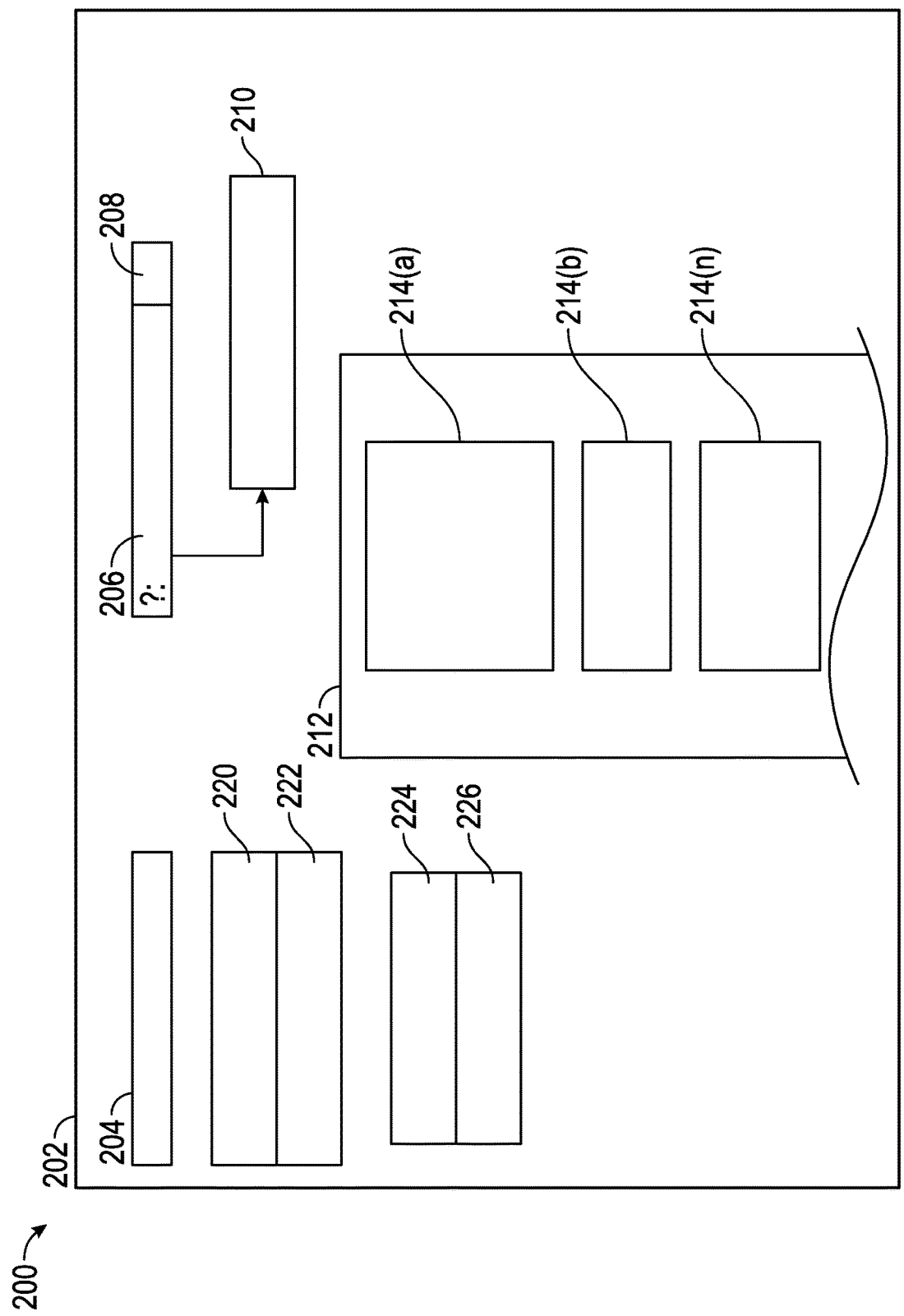
FIG. 2 is an exemplary layout of a feed-based user interface within a browser window in accordance with an embodiment.

Referring now to FIG. 2, an exemplary layout 200 for a feed-based user interface includes a screen 202 within a browser window. The screen 202 may include one or more branding indicia 204 such as the company name, logo, and the like, a login button 220, and a "sign up" or "register" function 222. A question field 206, a "Go" (or "Search") virtual button 208, and an optional deflection field 210 allow the user to enter search terms (e.g., in the form of a question) into the system. Group, company, or team affiliation indicia 224 and user indicia 226 (which may include a user photo or avatar) may also be provided.

With continued reference to FIG. 2, updated tracked objects, news items, or any combination of desired content may be displayed in a real time, continuously updatable feed 212 configured to sequentially display posts 214(a), 214(b) . . . 214(n). Each post 214 typically involves a single update to a single record or object, and is formatted in accordance with a universal, static template which includes the following fields: i) author; ii) preamble; iii) content; and iv) actions. Consequently, it is difficult for a user to readily distinguish an important post from relatively unimportant posts based on a cursory review of the feed. Rather, in order to determine which posts are more important than other posts, the user generally has to open and read a large number of posts, which can be cumbersome and time consuming.

Accordingly, in various embodiments smart criteria are applied to the feed to identify the higher priority posts, and to visually distinguish the important posts from the less important posts. In this way, a user can quickly identify the important posts upon a casual review (e.g., scrolling) of the feed without having to read all of the underlying content. That is, once the higher priority posts are identified based on predetermined "smart" criteria, they can then be set off from the remaining posts within the feed through the use of one or more visual cues, as described in greater detail below.

Figure 3:
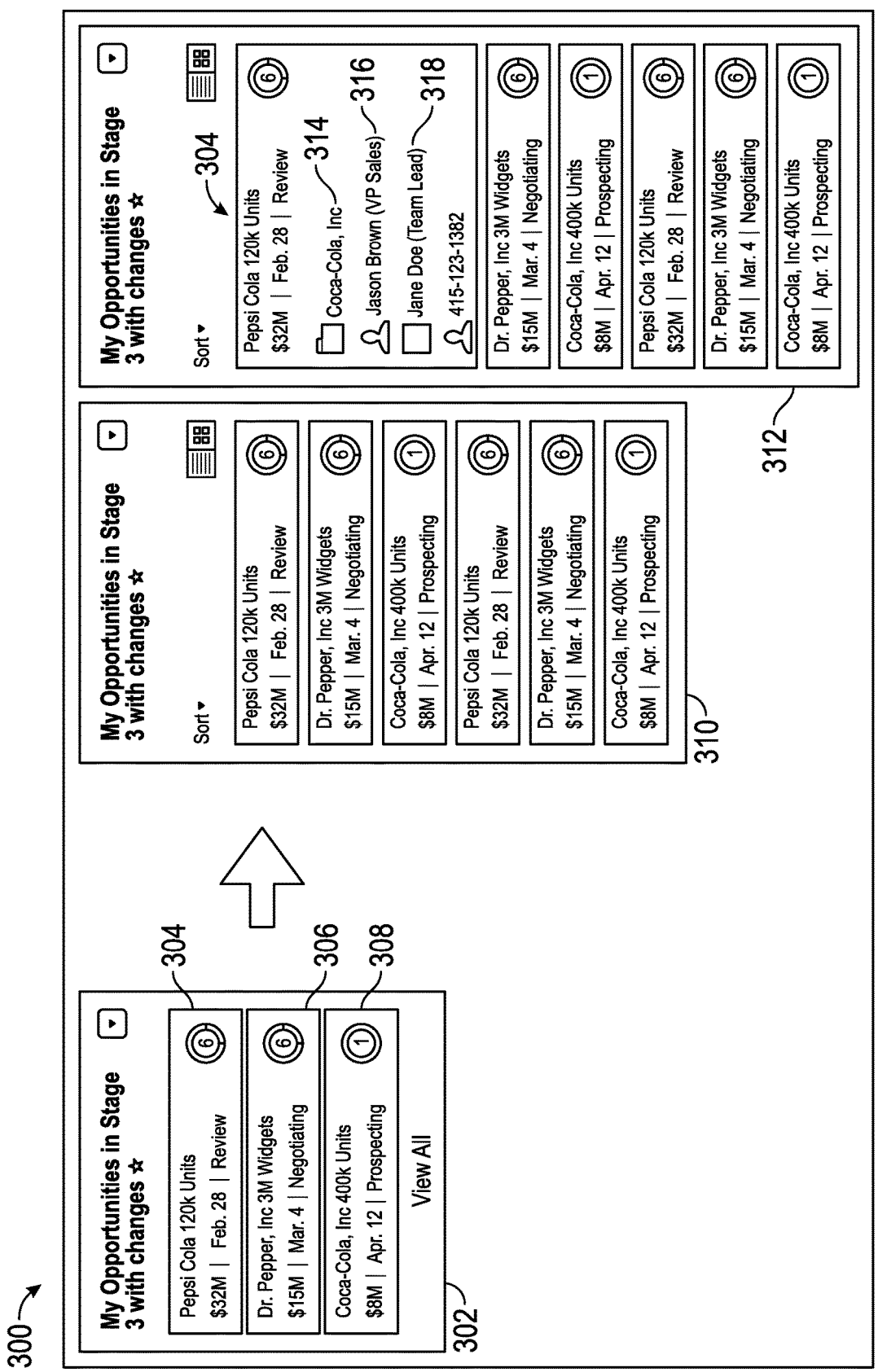
FIG. 3 is a screen shot of an exemplary smart post in the form of a summary post in accordance with an embodiment.

FIG. 3 is a screen shot 300 of an exemplary smart post in the form of a summary post. That is, in accordance with one embodiment, one specie of a smart post involves assembling a plurality of logically related posts into a single smart post "container", and displaying the container as a single post or tile, using visual cues to readily identify the container to the user as a summary post. In the illustrated example, a summary tile 302 (also referred to as a clumped feed item) includes those individual posts which satisfy predetermined smart criteria, and is entitled "My opportunities in stage 3 with changes". The summary post 302 includes a first post 304 ("Pepsi Cola 120k Units"); a second post 304 ("Dr. Pepper, Inc 3M Widgets"); and a third post 306 ("Coca-Cola, Inc 400k Units").

In this regard, a salesperson or sales manager may be very interested in latter stage (e.g., stage 3) opportunities as they may be closing soon. A template smart post with smart criteria for showing a user's opportunities in stage 3 with changes may be provided by an on-demand services environment or, alternatively, the template may be configured by an administrator of the organization for the user in the on-demand services environment. As shown in FIG. 3, the smart post may be provided to the user in a social feed context, where selecting the smart post may reveal a second column 310 which provides more information to the user, along with various actions that the user may take.

With continued reference to FIG. 3, a third column 312 displays related objects connected to an opportunity as stored in the on-demand services environment. The on-demand services environment may generate such a smart post in the form of a display card, a "hero" post that displays information in larger font with varied colors and styles to bring attention to the item, a combined feed display unit that clumps and/or summarizes multiple updates, and so forth.

For example, upon selecting the opportunity 304 named "Pepsi Cola 120k Units" the user interface element embodying the opportunity may expand to display more detailed information about the opportunity, such as one or more updates about the opportunity posted by one or more users of the on-demand services environment. For example, the opportunity 304 may be in a compete status with a rival company, such Coca-Cola, Inc. (update 314), or may have an update 316 to one of the contacts associated with the account, Jason Brown (VP Sales), or may have an Team Lead update 318, Jane Doe. By clumping these information items within a single smart post and visually distinguishing the summary post from other posts, the user can quickly identify the stage 3 opportunities with changes, and determine whether to review the underlying content without having to first read each clumped post.

Figure 4:
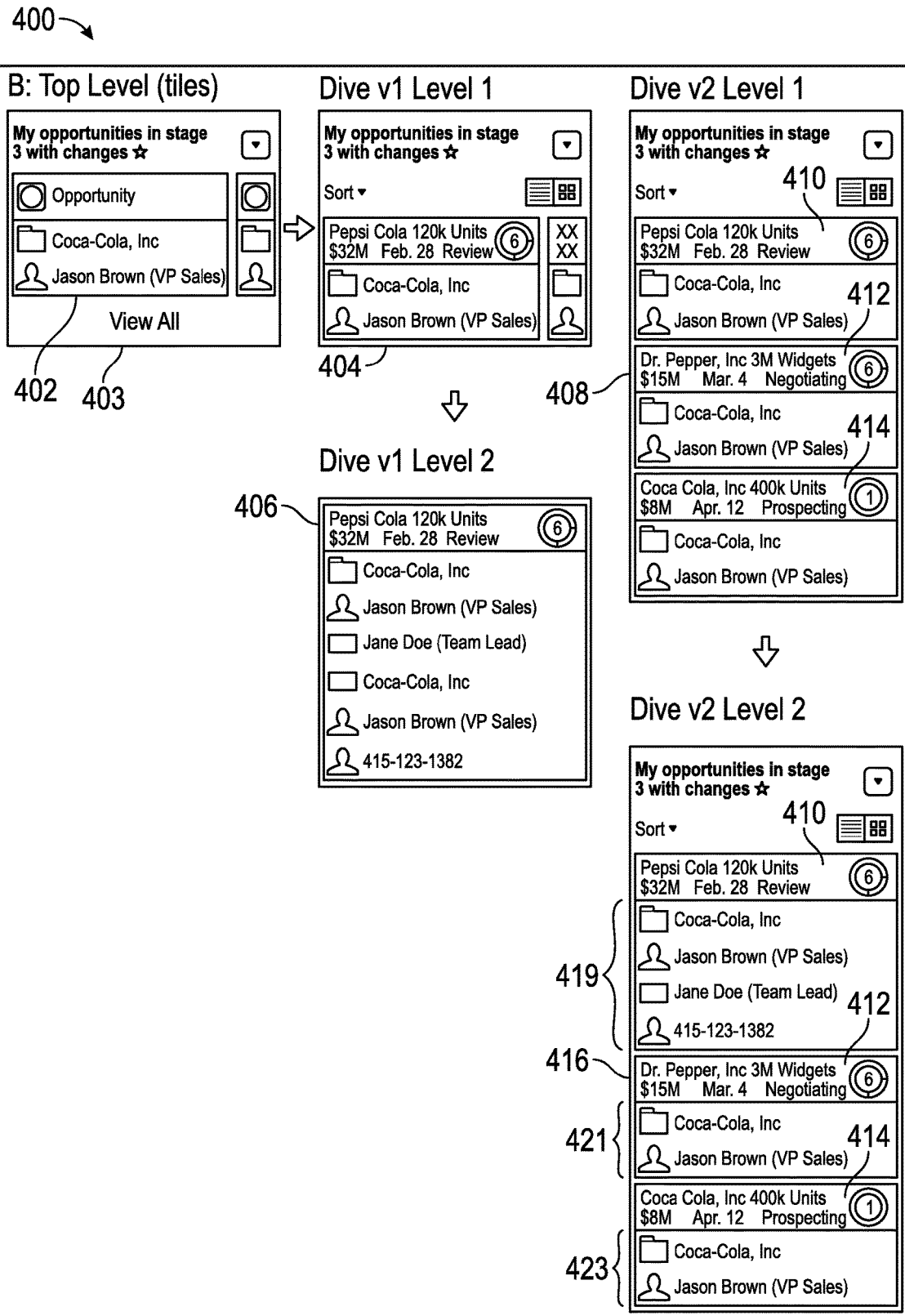
FIG. 4 is an alternate embodiment of the smart post shown in FIG. 3.

FIG. 4 illustrates an alternate embodiment of the smart post shown in FIG. 3, where opportunities may be selected in a horizontal user interface at the top level in a summary tile and individually drilled down into more detail. More particularly, a screen shot 400 includes a summary post 402 having a 'view all' icon 403. In one embodiment, selecting the view all icon 403 presents an expanded post 404 which displays the other stage 3 opportunities in a horizontal extension (truncated fir clarity). When one of the opportunities in the expanded post 404 is clicked on, the underlying change records are displayed in a window 406. In an alternate embodiment, selecting the view all icon 403 presents an expanded post 408 which displays the other stage 3 opportunities (410, 412, 414) in a vertically extended window 408. Selecting opportunity 410 reveals related posts 419, whereas selecting opportunities 412 or 414 reveals related posts 421 and 423, respectively.

Figure 5:
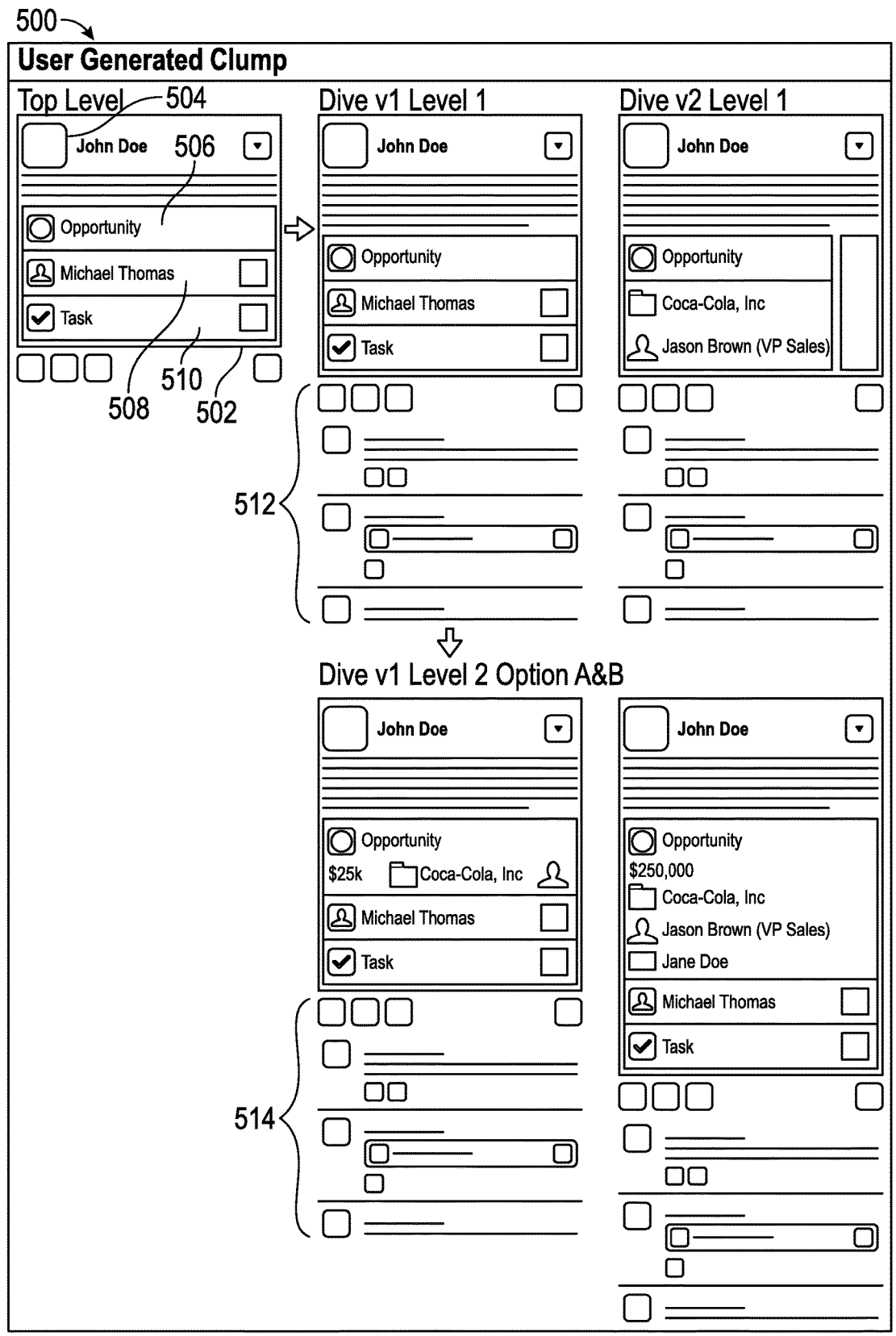
FIG. 5 is a screen shot depicting a smart post created by a user including three clumped user generated activities in accordance with an embodiment.

FIG. 5 illustrates a screen shot 500 depicting a smart post 502 created by a user 504 ("John Doe"), the user-generated post comprising three clumped user generated activities: i) an opportunity 506; ii) an opportunity contact 508 ("Michael Thomas"); and iii) a task 510 associated with the opportunity 506. These user-generated activities 506, 508, 510 may be displayed in the form of a clumped user interface element 502, as opposed to three separate posted feed items. Upon selecting the clumped item 502, it may expand to display more detailed information 512 about each user-generated activity, and/or notifications 514 of one or more updates for each activity. As a result, the viewing user may work directly from and expanded view of the smart post within the feed and receive relevant updates that may otherwise have been missed in the 'fire hose' of feed items.

In various embodiments, the system may identify that several (e.g., three in the example shown in FIG. 5) user-generated activities are related based on the circumstances surrounding their creation, such as, for example, a user creating the opportunity, adding a contact to the same opportunity, and creating a task associated with the opportunity. As such, updates to these records may be identified as related and aggregated together into a summary post.

As briefly discussed above, posts in a feed typically employ a "one size fits all" template or format which includes the following fields: author, preamble, content, action. In accordance with various embodiments, the format, stylization, font, color scheme, the number and order of the fields, and various other graphical elements may be configured to create specialized "hero" posts.

Figure 6:
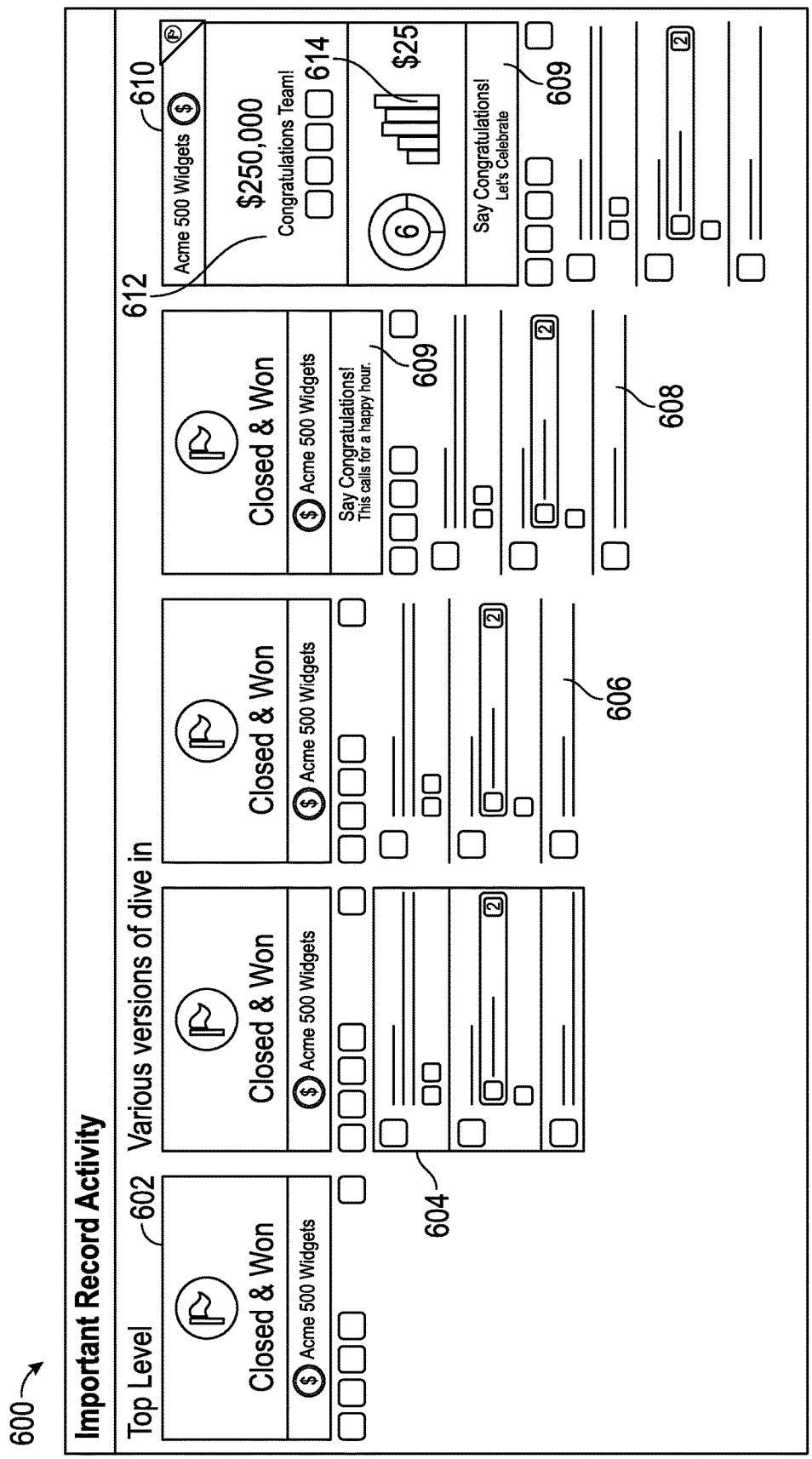
FIG. 6 is a screen shot illustrating a hero post and various expanded hero posts in accordance with various embodiments.

FIG. 6 is a screen shot 600 illustrating a hero post 602 and various embodiments of expanded hero posts 604, 606, 608, and 610. More particularly, hero post 602 indicates that the opportunity object for Acme 500k Widgets has been closed and won. The hero post may be generated based on predetermined triggers, such as an opportunity value increasing over a threshold value (e.g., $1M), closed opportunities, stale opportunities, or other predetermined metrics. The hero post may be designed with a bright color that distinguishes it from other content in the feed. The font, style, color and design of the hero post may be customized by administrators or users.

A smart post may include various vantage points for different users viewing the same information based on the information about the users. For example, a sales manager may be more concerned with motivating team members to close deals, such that closed deals warrant immediate recognition, praise, and interactions via a social feed. A feed item 608, 610 may appear as a hero post that includes a field 609 which enables a sales manager to "Say congratulations!" However, the vice president of sales may be more concerned with sales forecasts and how likely a certain sales quota will be met. Thus, the feed item 610 may simply show an updated forecast 614 of the sales quarter based on the closed opportunity. Thus, the closing of an opportunity may generate a feed item for the sales manager that looks different from the feed item generated for the vice president of sales, based on the same underlying content.

Once the hero post 601 is selected (clicked on) by the user, it may expand to display one or more detailed updates associated with the hero post and/or one or more actions that may be performed by the viewing user by interacting with the hero post. For example, one of the "dive-ins" or expanded versions 604, 606, 608, 610 may include other user-generated posts related to the hero post, such as the message "Say Congratulations!" to the user or users that closed the opportunity. In another embodiment, the expanded user interface may provide aggregated information about the opportunity, such as the opportunity value 612 (e.g., $250,000), the stage of the sales process, profile images for the users that are included in the team that closed the opportunity, as well as an option to communicate with the team. In other embodiments, different combinations of interactions and displaying any desired related information may be provided within the expanded user interface.

Adaptable templates for displaying the same underlying content in different ways to different users, depending on their roles and/or vantage point, are discussed in greater detail below in connection with FIG. 18.

Figure 7:
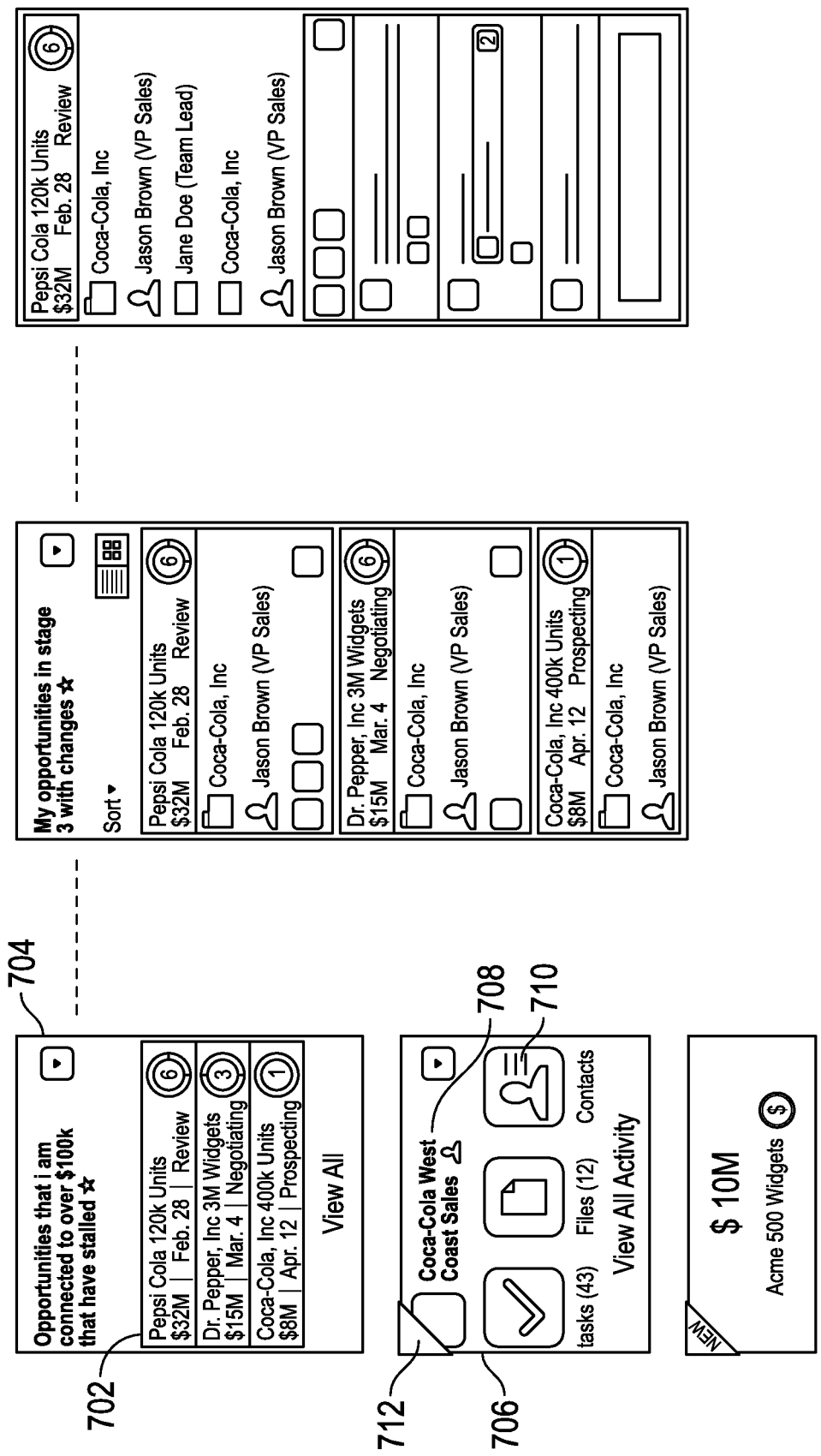
FIG. 7 is a screen shot of clumped/summarized posts, relevant content feed items, and hero posts in accordance with various embodiments.

FIG. 7 further illustrates additional examples of clumped/summarized posts, relevant content feed items, and hero posts. More particularly, a smart post 702 may be generated based on predetermined business logic bearing a title field (heading) 704 "Opportunities that I am connected to over $100k that have stalled." Business logic may be inputted and configured by a user or an administrator of the on-demand services environment. Also illustrated in FIG. 7 is a summary post 706 which includes a heading 708 "Coca-Cola West Coast Sales," where the West Coast sales group is a group on the on-demand services environment. The summary post 706 may also include an indicator field 710 that graphically highlights the summary post to indicate that there has been activity in the group, such as task creation, files, contacts, and so forth. The summary post may be marked as "hot" using a special "hot" indicator 712 as a distinctive visual cue to highlight the post.

Figure 8:
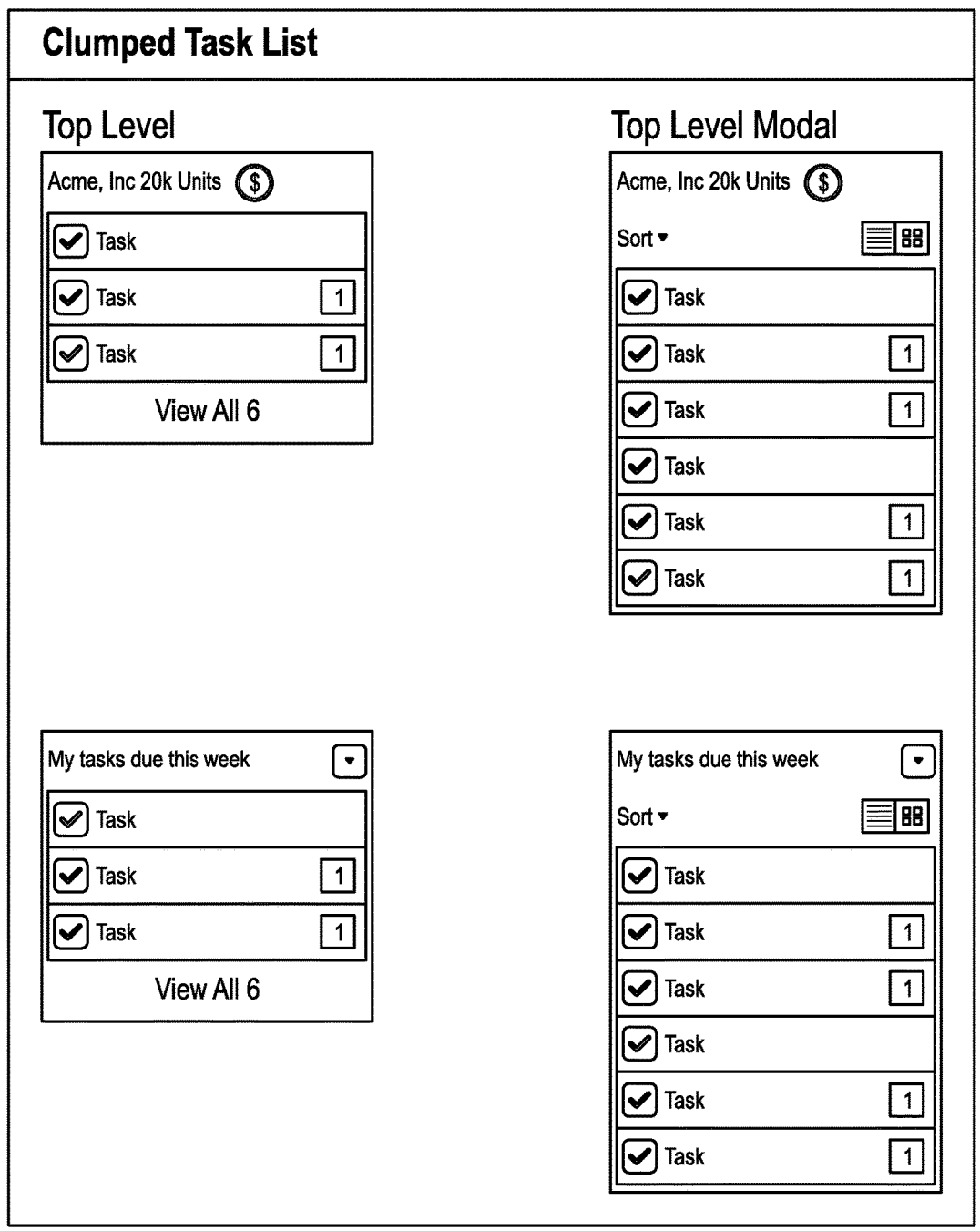
FIG. 8 is a screen shot illustrating various embodiments of clumped tasks in a smart post.
Figure 9:
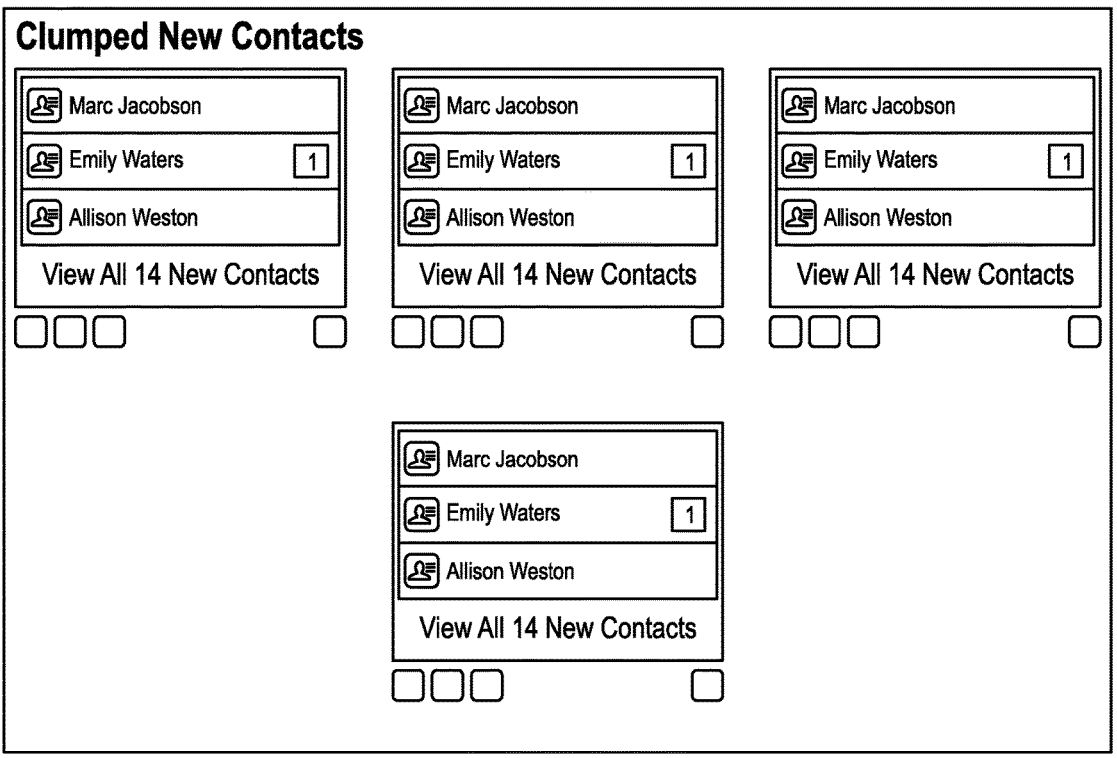
FIG. 9 is a screen shot illustrating various embodiments of clumped new contacts in a smart post.

FIG. 8 is a screen shot 802 illustrating various embodiments of clumped tasks in a feed item post, and FIG. 9 is a screen shot 902 illustrating various embodiments of clumped new contacts. The clumped post may include specific colors assigned for each type of record being clumped, such as tasks, contacts, and so forth, such that the viewing user may quickly scan a feed to identify interesting, important, and relevant content based on the visual cues incorporated into the posts.

Figure 10:
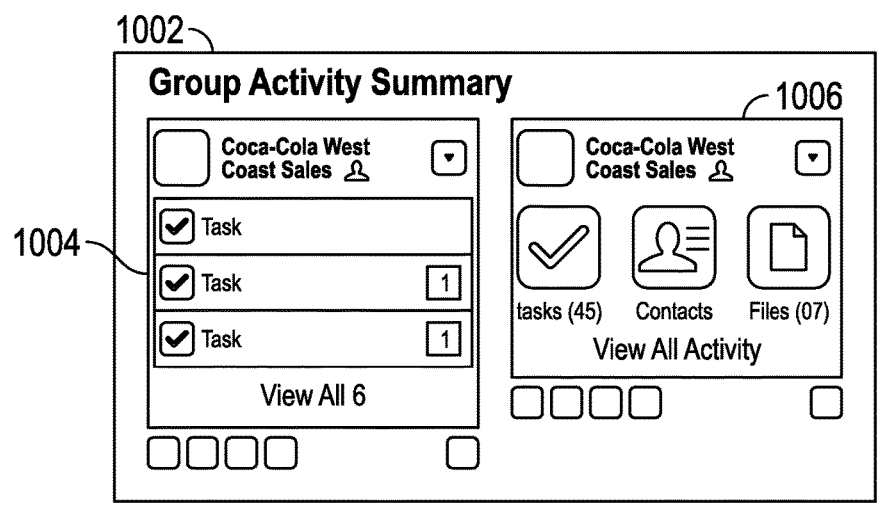
FIG. 10 is a screen shot illustrating alternate embodiments of group activity summary posts.
Figure 11:
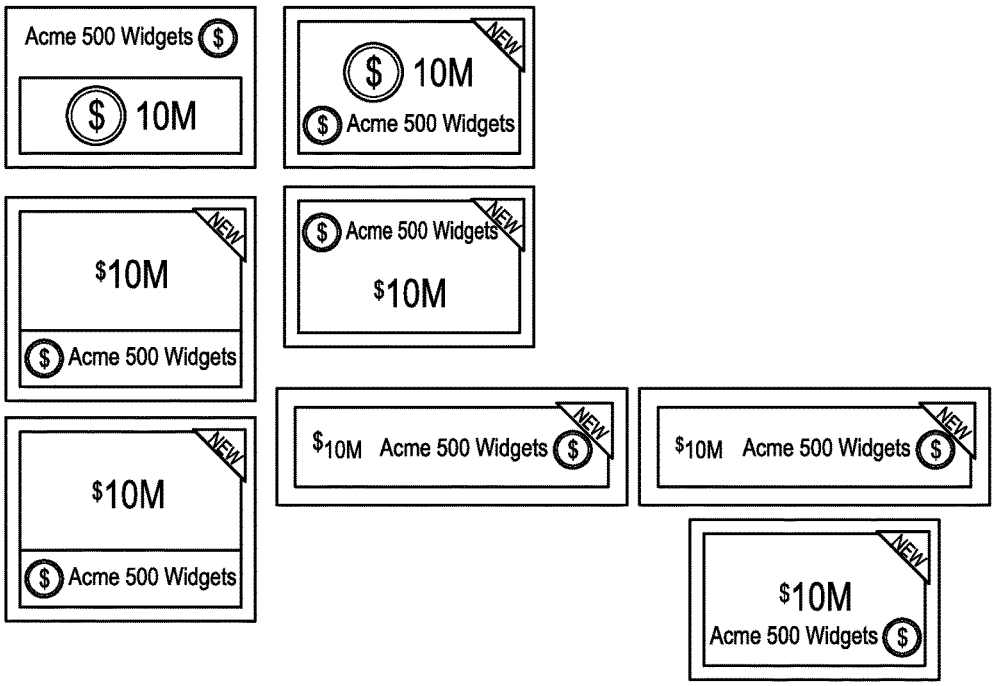
Figure 12:
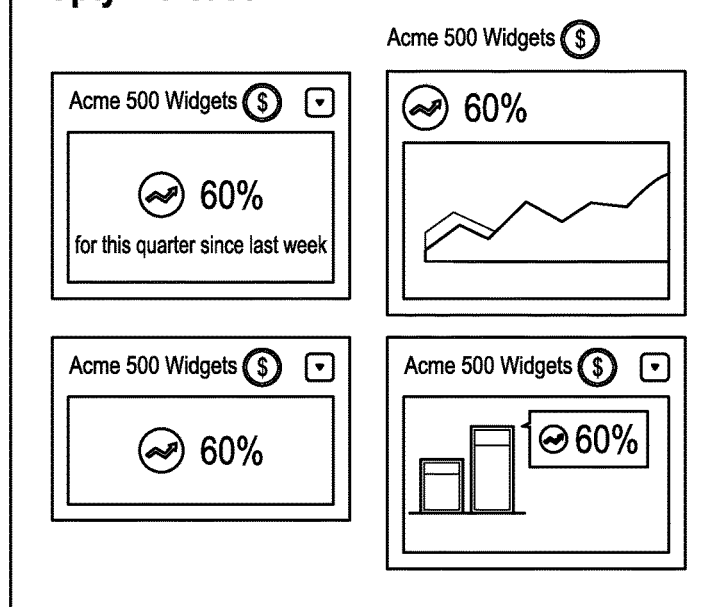
Figure 15:
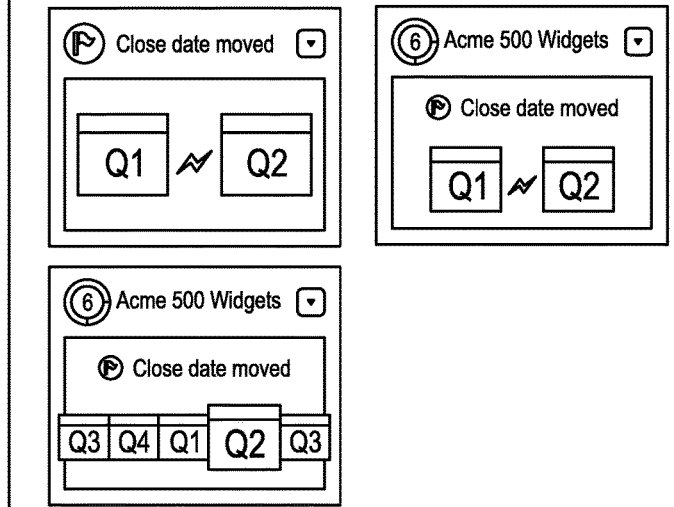

FIG. 10 is a screen shot 1002 illustrating respective alternative embodiments 1004, 1006 of group activity summary posts relating to the West Coast sales group.

FIGS. 11, 12, 13, 14 and 15 illustrate different types of hero posts, such as: a new opportunity hero post 1102 (Big Deal Alerts); a change in percentage value hero post 1202 indicating an opportunity value increasing beyond a predetermined threshold value (e.g., a 60% increase in the value of the opportunity); a pipeline increase hero post 1302 indicating the amount of work currently in process increasing beyond a predetermined threshold (e.g., 15%); a trending topics hero post 1402 displaying topics which satisfy predetermined keyword metrics in the on-demand services environment; and a close date moved hero post 1502 indicating that a closing date has moved in a manner which satisfies predetermined criteria (e.g., from one calendar quarter to another). Different types of hero posts may also include various graphs, images, colors, font sizes, and other graphical and/or visual cues.

Figure 16:
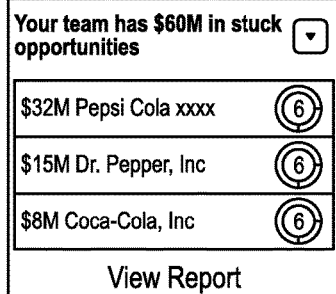
FIG. 16 is a screen shot illustrating various embodiments of system-generated smart posts.
Figure 16:
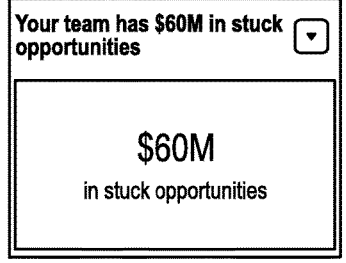
Figure 16:
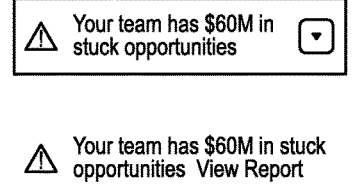
Figure 16:
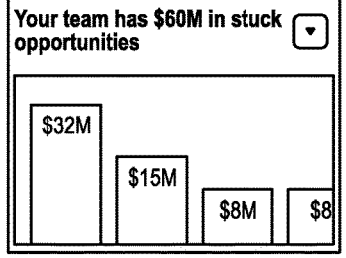
Figure 16:
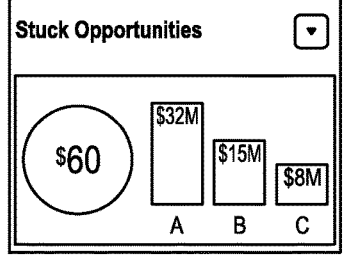
Figure 16:
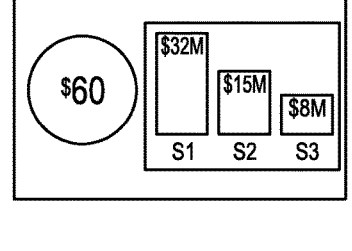

FIG. 16 is a screen shot 1602 illustrating different embodiments of system-generated posts relating to "stuck opportunities", which may be defined by administrators of an organization and which may include opportunities which are not progressing in accordance with predetermined metrics. By way of non-limiting example, an alert-type smart FTC may be created based on the fact that something has not happened for a predetermined or default period of time (inactivity), as opposed to creating an alert based on the fact that something has happened.

With continued reference to FIG. 16, different sizes of posts may be provided by the on-demand services environment, including different types of content such as: a post 1604 indicating the top three opportunities a post 1606 depicting the top three opportunities ordered by the respective values of the opportunities; a post 1608 showing the total value of stuck opportunities (e.g., $60M); a post 1610 showing stuck opportunities by name (A, B, C); a post 1612 showing stuck opportunities by stage or date (S1, S2, S3); and a post 1614 displaying a brief (e.g., one-line) statement about one or more stuck opportunities.

Figure 17:
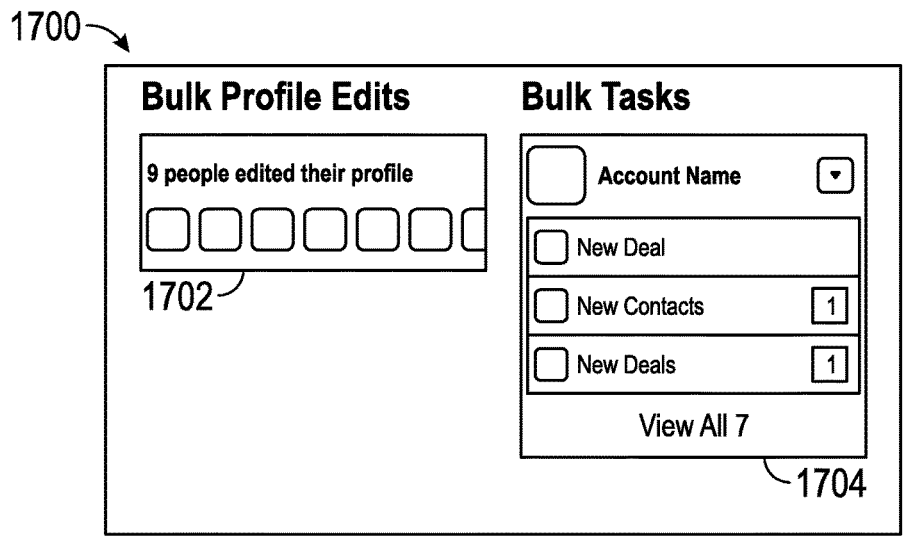
FIG. 17 is a screen shot illustrating a bulk post in accordance with an embodiment.

FIG. 17 is a screen shot 1700 illustrating one embodiment of a bulk post 1702 indicating that nine people have edited their profiles, and another embodiment of a bulk post 1704 indicating that seven tasks have been updated.

Configurable templates for displaying content differently to different users depending on their perspective were discussed above in connection with FIG. 6. As a further example, in contrast to the traditional "author, preamble, content, action" format of typical feed posts, FIG. 18 illustrates an alternative user interface feed item template 1800 for smart posts. More particularly, the template 1800 may include an icon field 1810 that provides the user with an eye-catching image, photograph, or other visual cue.

Figure 18:
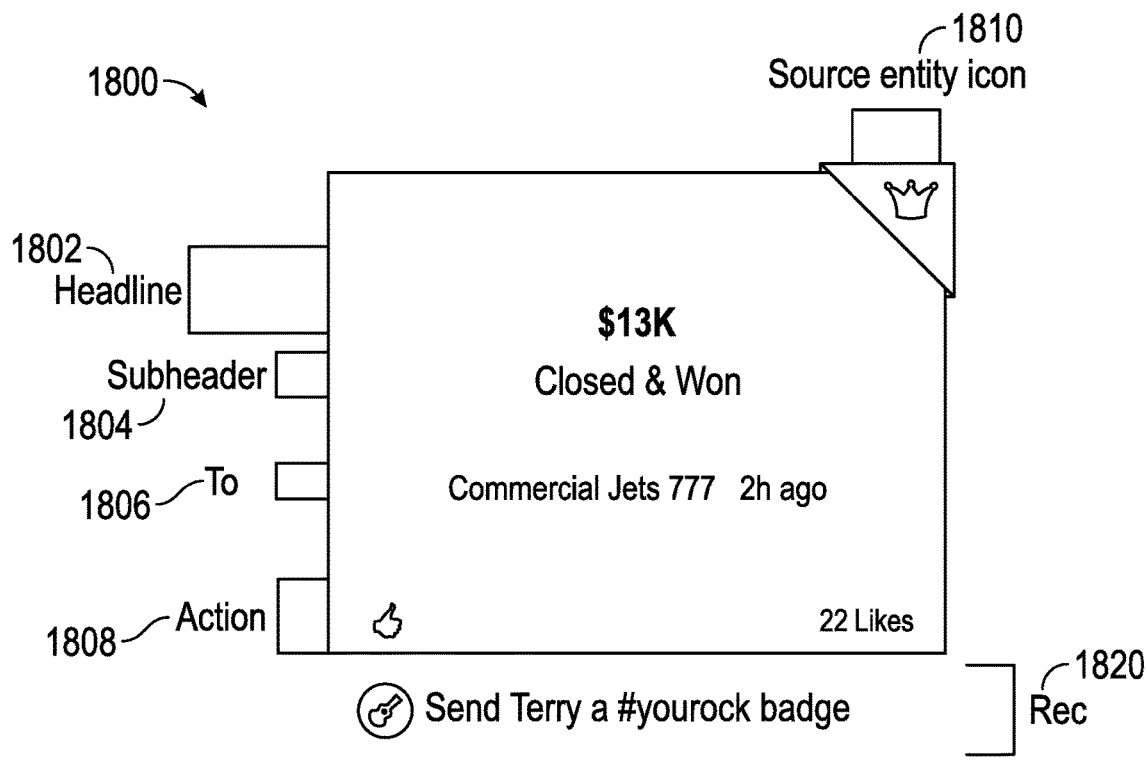
FIG. 18 is a screen shot illustrating an alternate user interface feed item template for smart posts in accordance with an embodiment.

With continued reference to FIG. 18, template 1800 may also include a headline field 1802 (e.g., "$13k"); a subheader field 1804 (e.g., "Closed & Won"); a subject field 1806 (e.g., "Commercial Jets 777"; an action drop down icon 1808; and a recommended action field 1820 (e.g., "Send Terry a #yourock badge"). Alternatively, the recommended action may be an action in the on-demand services environment, such as sending a message, creating a task, an opportunity, a record, or any other object in the on demand services environment.

Yet another embodiment of smart FTC posts involves using preconfigured metrics to create a summary or aggregate of content comprising a plurality of media types (e.g., text, chart, graph, photo, audio/video file) into a single container. Using such multi-media payload posts, users of the on-demand services environment may publish a post that includes multiple rich content items, such as dashboard graphs, reports, figures, file attachments, and so forth. A user may select one or more rich payload content items for inclusion in a post, for example, through a user interface. Alternatively, a user or administrator may preconfigure the system to automatically generate multiple rich payload posts based on one or more triggers or events in the on-demand services environment.

Figure 19:
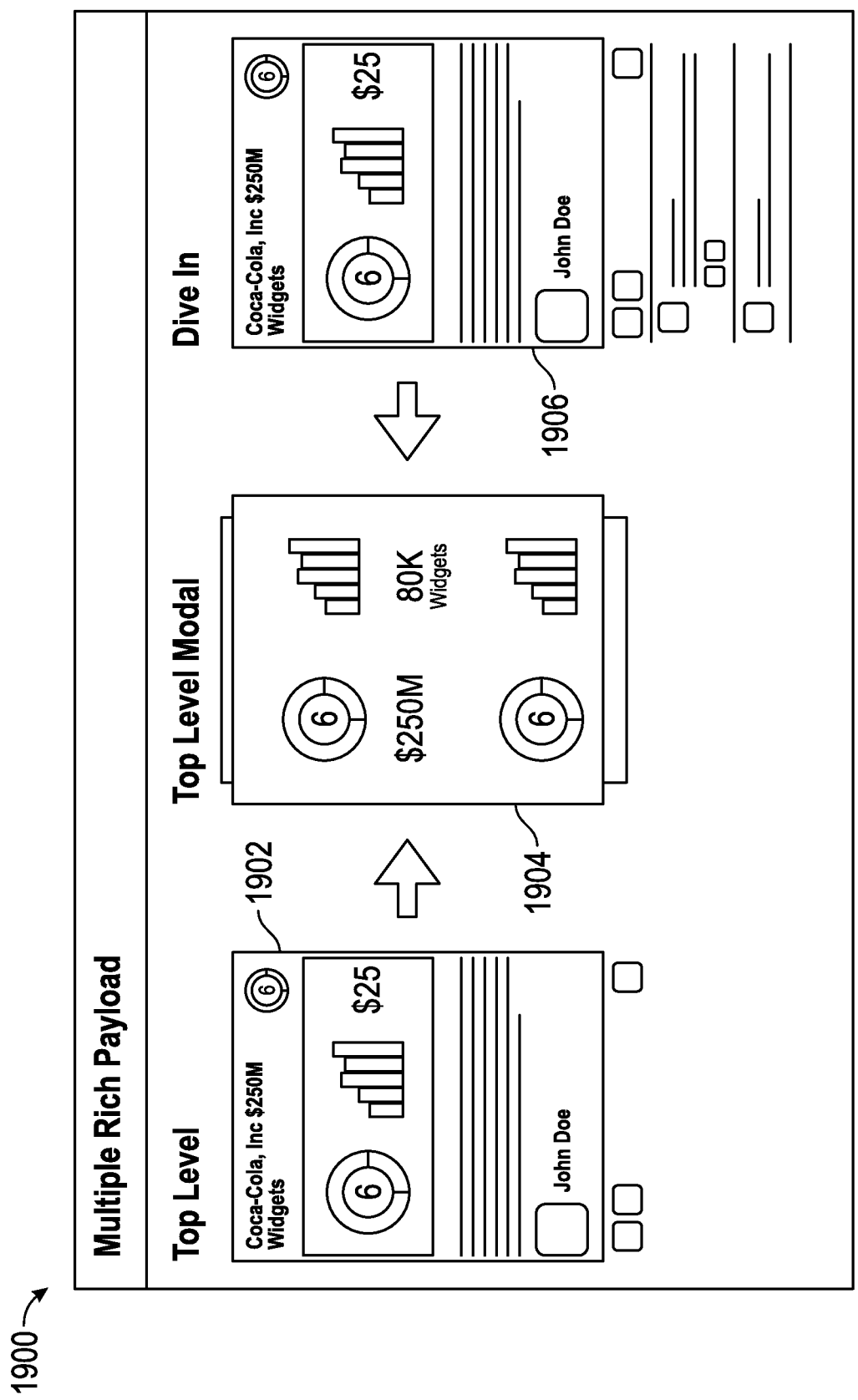
FIG. 19 is a screen shot illustrating various embodiments of multiple rich payload smart posts.

FIG. 19 is a screen shot 1900 illustrating various embodiments of multiple rich payload posts such as may be provided in an on demand services environment. A multiple rich payload post 1902 may include a graphic representing the stage or status of an opportunity, a bar graph showing a history of opportunities with the account, as well as other rich payload content. A user may selectively include rich payload content as well as text content to attach to the post.

In one embodiment, a viewing user of the multiple rich payload post 1902 may be provided with a summarized view that enables the viewing user to scroll or swipe through previews of the rich payload content items within the post. More particularly, upon selecting the post 1902, a model view post 1904 or an immersive view post 1906 may be provided to the viewing user to examine the rich payload content items. In other embodiments, a template may be configured by an administrator of the organization for the user in the on-demand services environment for generating multiple rich payload posts.

The following technique may be used to provide multiple rich payload posts in feeds to users of an on-demand services environment.

A user of an on-demand services environment may select more than one rich payload content item based on records in the on-demand services environment, including graphs, dashboards, reports, and so forth. The selected rich payload content items may be included in a multiple rich payload post to be provided to other users through a social feed in the on-demand services environment. In one embodiment, a summary post may include multiple content items viewable in two axes (e.g., an X-Y graph format) such that the content items may be scrolled through horizontally and vertically.

An improved method is thus provided for displaying posts in an on-line social network feed of the type characterized by successive posts, each having a substantially homogeneous visual format. The method may include: tracking updates to a record; determining content for a smart post by applying smart criteria to the tracked updates; configuring the smart post with the determined content and at least one distinct visual cue; and displaying the smart post in the feed.

In an embodiment, the substantially homogeneous visual format may include the following fields: author; preamble; content; and action. A record may include one of an account, opportunity, lead, case, user, group, or other file type.

In an embodiment, the smart criteria may include predetermined metrics for evaluating a tracked update based on at least one of: human generated versus non-human generated; an opportunity value increasing over a threshold amount; an opportunity value increasing over a threshold percentage; the closing of an opportunity having a value in excess of a threshold; at least one additional lead; trending; stuck opportunities; and multiple changes to the same record or related records.

In an embodiment, determining a smart post may involve aggregating tracked updates to either a single record or related records into a summary post.

In an embodiment, the smart criteria may be determined by either a user or an administrator.

In an embodiment, configuring the smart post may involve arranging the smart post in accordance with a static format which is different from the substantially homogeneous visual format.

In an embodiment, configuring the smart post may involve arranging the smart post in accordance with a configurable template which is different from the substantially homogeneous visual format.

In an embodiment, the method may also include subscribing, by a first user, to feed tracked changes (FTCs) for a first record, and wherein displaying comprises displaying a smart post associated with the first record for the first user.

In an embodiment, displaying may include interposing the smart post into the on-line social network feed among the successive posts having the substantially homogeneous visual format such that the distinct visual cue associated with the smart post is readily discernible by a user.

In an embodiment, the distinct visual cue may be configured to visually distinguish the smart post from the substantially homogeneous visual format using one or more of: format, stylization, font, color scheme, graphical elements, text, the number and order of fields associated with the smart post, and the relative size and placement of the foregoing.

In an embodiment, the on-line social network comprises a cloud based, on-demand, multi-tenant computing environment.

In an embodiment, tracking updates may include: storing an object corresponding to the record in a database connected to the on-line social network; and associating changes to the record with the stored object.

In an embodiment, determining content may involve aggregating at least two of the following media types into a single "multiple rich payload" container: text, chart, graph, photo, audio, and video.

In an embodiment, determining content for a smart post may also include manually selecting, by a user, two or more related updates to a particular record and clumping the two or more related updates into a single clumped smart post.

A computer application embodied in a non-transitory medium is also provided for operation by a computer processor associated with an on-line social network feed characterized by successive posts each having a substantially homogeneous visual format. The application may be configured to implement the steps of: tracking updates to a record; determining content for a smart post by applying smart criteria to the tracked updates; configuring the smart post with the determined content and at least one distinct visual cue; and displaying the smart post in the feed.

In an embodiment of the computer application, a record may comprise one of an account, opportunity, lead, case, user, group, or file, and further wherein the smart criteria may comprise predetermined metrics for evaluating a tracked update based on at least one of: human generated versus non-human generated; an opportunity value increasing over a threshold amount; an opportunity value increasing over a threshold percentage; the closing of an opportunity having a value in excess of a threshold; at least one additional lead; trending; stuck opportunities; and multiple changes to the same record or related records.

In an embodiment, the at least one distinct visual cue may be configured to visually distinguish the smart post from the substantially homogeneous visual format using at least one of: format, stylization, font, color scheme, graphical elements, text, the number and order of fields associated with the smart post, and the relative size and placement of the foregoing.

A method is also provided for reducing noise in a social media feed of the type including successive posts each having a substantially homogeneous format. The method may involve: identifying a plurality of related updates to a record; configuring a single smart post to include underlying content from each of the plurality of related updates, and a visual cue distinct from the substantially homogeneous format; and displaying the smart post in the feed.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. An improved method of displaying posts in an on-line social network feed, the method comprising:
   tracking a plurality of updates to a record in a database by one or more users;
   determining content for a smart post by applying criteria to the plurality of updates to summarize the plurality of updates to the record, wherein the smart post comprises a container for a plurality of logically related posts and the criteria includes one or more metrics based on multiple changes to the record or related records, the determined content indicates a value associated with the record increasing beyond a predetermined threshold value, and the determined content includes at least one graphic representing a stage or status of the record;

configuring the smart post with the determined content summarizing the plurality of updates to the record and at least one distinct visual cue; and displaying the smart post in the feed among a plurality of successive posts involving single updates to single records in the database, the plurality of successive posts being sequentially displayed in the feed and having a substantially homogenous visual format, wherein the smart post is displayed using the at least one distinct visual cue to visually distinguish the smart post within the feed from the substantially homogenous visual format; and expanding the smart post to display more detailed information about the plurality of updates to the record within the feed when the smart post is selected.

2. The method of claim 1, wherein the substantially homogeneous visual format comprises the following fields: author; preamble; content; and action.

3. The method of claim 1, wherein the record in the database comprises one of an account, opportunity, lead, case, user, group, or file.

4. The method of claim 1, wherein the criteria further comprises predetermined metrics for evaluating a tracked update based on at least one of:

human generated versus non-human generated posts;
a record field value increasing over a threshold amount;
a record field value increasing over a threshold percentage;
the closing of a record having a field value in excess of a threshold;
at least one additional lead;
trending; and
stuck opportunities.

5. The method of claim 1, wherein determining the content for the smart post comprises aggregating the plurality of updates to the record into a summary post.

6. The method of claim 1, wherein determining the content for the smart post comprises aggregating the plurality of updates to related records into a summary post.

7. The method of claim 1, wherein configuring the smart post comprises arranging the smart post in accordance with a static format different from the substantially homogeneous visual format.

8. The method of claim 1, wherein configuring the smart post comprises arranging the smart post in accordance with a configurable template different from the substantially homogeneous visual format.

9. The method of claim 1, wherein the at least one distinct visual cue is configured to visually distinguish the smart post from the substantially homogeneous visual format using at least one of: format, stylization, font, color scheme, graphical elements, text, the number and order of fields associated with the smart post, and the relative size and placement of the foregoing.

10. The method of claim 1, wherein the on-line social network comprises a cloud based, on-demand, multi-tenant computing environment.

11. The method of claim 1, wherein tracking updates comprises:

storing an object corresponding to the record in database connected to the on-line social network; and
associating changes to the record with the stored object.

12. The method of claim 1, wherein determining content comprises aggregating at least two of the following media types into a single container: text, chart, graph, photo, audio, and video.

13. The method of claim 1, wherein determining the content for the smart post further comprises manually selecting, by a user, two or more related updates to a particular record and clumping the two or more related updates into a single clumped smart post.

14. A computer application embodied in a non-transitory medium for operation by a computer processor associated with an on-line social network feed, the application configured to implement the steps of:

tracking a plurality of updates to a record in a database by one or more users;

determining content for a smart post by applying criteria to the plurality of updates to summarize the plurality of updates to the record, wherein the smart post comprises a container for a plurality of logically related posts and the criteria includes one or more metrics based on multiple changes to the record or related records, the determined content includes at least one graphic representing a stage or status of the record, and the determined content indicates at least one of a value associated with the record increasing beyond a first predetermined threshold value and an amount of work in process associated with the record increasing beyond a second predetermined threshold value;

configuring the smart post with the determined content summarizing the plurality of updates to the record and at least one distinct visual cue;

displaying the smart post in the feed among a plurality of successive posts involving single updates to single records in the database, the plurality of successive posts being sequentially displayed in the feed and having a substantially homogenous visual format, wherein the smart post is displayed using the at least one distinct visual cue to visually distinguish the smart post within the feed from the substantially homogenous visual format; and expanding the smart post to display more detailed information about the plurality of updates to the record within the feed when the smart post is selected.

15. The computer application of claim 14, wherein the record in the database comprises one of an account, opportunity, lead, case, user, group, or file, and further wherein the criteria further comprises predetermined metrics for evaluating a tracked update based on at least one of:

human generated versus non-human generated;
an opportunity value increasing over a threshold amount;
an opportunity value increasing over a threshold percentage;
the closing of an opportunity having a value in excess of a threshold;
at least one additional lead;
trending; and
stuck opportunities.

16. The computer application of claim 14, wherein the at least one distinct visual cue is configured to visually distinguish the smart post from the substantially homogeneous visual format using at least one of: format, stylization, font, color scheme, graphical elements, text, the number and order of fields associated with the smart post, and the relative size and placement of the foregoing.

17. The method of claim 1, wherein the graphic comprises one or more of:

a chart;
a graph;
a bar graph;
a forecast;
a dashboard; and
a report.

18. An improved method of displaying posts in an on-line social network feed, the method comprising:
   tracking a plurality of updates to a record in a database by one or more users;
   determining content for a smart post by applying criteria to the plurality of updates to summarize the plurality of updates to the record, wherein:
      the smart post comprises a container for a plurality of logically related posts;
      the criteria includes one or more metrics based on multiple changes to the record or related records;
      the determined content indicates an amount of work in process associated with the record increasing beyond a predetermined threshold value; and
      the determined content includes at least one graphic representing a stage or status of the record;
   configuring the smart post with the determined content summarizing the plurality of updates to the record and at least one distinct visual cue; and
   displaying the smart post in the feed among a plurality of successive posts involving single updates to single records in the database, the plurality of successive posts being sequentially displayed in the feed and having a substantially homogenous visual format, wherein the smart post is displayed using the at least one distinct visual cue to visually distinguish the smart post within the feed from the substantially homogenous visual format; and
   expanding the smart post to display more detailed information about the plurality of updates to the record within the feed when the smart post is selected.

* * * * *